(12) United States Patent  (10) Patent No.: US 8,040,869 B2
Gaspard et al.  (45) Date of Patent: Oct. 18, 2011

| | | | |
|---|---|---|---|
| (54) | METHOD AND APPARATUS FOR AUTOMATIC DISCOVERY OF LOGICAL LINKS BETWEEN NETWORK DEVICES | | |
| (75) | Inventors: | Moise Gaspard, Nepean (CA); Thomas Flynn, Ottawa (CA); Chuong Ngoc Ngo, Ottawa (CA); Denis Proulx, Kanata (CA); Attaullah Zabihi, Ottawa (CA) | |
| (73) | Assignee: | Alcatel Lucent, Paris (FR) | |
| ( * ) | Notice: | Subject to any disclaimer, the term of this patent is extended or adjusted under 35 U.S.C. 154(b) by 2253 days. | |
| (21) | Appl. No.: | 10/029,123 | |
| (22) | Filed: | Dec. 19, 2001 | |
| (65) | | Prior Publication Data | |
| | US 2003/0112764 A1 | Jun. 19, 2003 | |
| (51) | Int. Cl. *H04J 3/24* (2006.01) | | |
| (52) | U.S. Cl. .................. 370/349; 370/241; 370/247 | | |
| (58) | Field of Classification Search .......... 370/229–235, 370/235.1–240, 241–253, 349, 395.32 See application file for complete search history. | | |

(56) References Cited

U.S. PATENT DOCUMENTS

| | | | |
|---|---|---|---|
| 5,175,800 A | 12/1992 | Galis et al. | |
| 5,491,796 A | 2/1996 | Wanderer et al. | |
| 5,500,934 A | 3/1996 | Austin et al. | |
| 5,550,816 A | 8/1996 | Hardwick et al. | |
| 5,835,720 A * | 11/1998 | Nelson et al. | 709/224 |
| 5,838,907 A | 11/1998 | Hansen | |
| 5,872,928 A | 2/1999 | Lewis et al. | |
| 6,061,505 A | 5/2000 | Pitchaikani et al. | |
| 6,292,472 B1 | 9/2001 | Rariden et al. | |
| 6,377,987 B1 | 4/2002 | Kracht | |
| 6,516,345 B1 | 2/2003 | Kracht | |
| 6,570,867 B1 * | 5/2003 | Robinson et al. | 370/351 |

(Continued)

FOREIGN PATENT DOCUMENTS

EP  0 455 402 A2  6/1991

(Continued)

OTHER PUBLICATIONS

Dupuy et al.; Netmate: A Network Management Environment; article; Mar. 1991, IEEE Network Magazine; pp. 35-43; Mar. 5, 1991, No. 2, New York, US.

*Primary Examiner* — Phuc Tran
(74) *Attorney, Agent, or Firm* — Ross D. Snyder & Associates, Inc.

(57) ABSTRACT

The present invention comprises a method and apparatus for automatic discovery of logical links between network devices. In one embodiment, the present invention comprises part of a network management system ("NM") that manages a discrete set of network devices. The NM sends SNMP queries to individual network devices managed by the NM to obtain interface configuration data for each of the network interfaces of the device. The information requested includes destination information ("next hop" or "neighbor" IP address) for data packets sent from the interface. The NM checks to see whether a logical link corresponding to the received configuration information already exists in a logical link database maintained by the NM. If such a link exists the NM checks to see if the existing information for the link is valid. If the existing link data is valid, no change is made. If the existing information is not valid, or if no corresponding link is found in the link database, the NM creates a new link corresponding to the new configuration information. In one or more embodiments, the NM displays a graphical view of the discovered IP links on a graphical network map.

41 Claims, 6 Drawing Sheets

U.S. PATENT DOCUMENTS

| | | |
|---|---|---|
| 6,584,503 B1 | 6/2003 | Carney et al. |
| 6,611,863 B1 | 8/2003 | Banginwar |
| 6,791,981 B1 | 9/2004 | Novaes |
| 6,891,793 B1 * | 5/2005 | Suzuki et al. ............... 370/217 |
| 6,895,433 B1 | 5/2005 | Slater et al. |
| 6,895,443 B2 * | 5/2005 | Aiken ............................ 709/245 |
| 6,912,587 B1 * | 6/2005 | O'Neil ........................... 709/232 |
| 6,917,626 B1 | 7/2005 | Duvvury |
| 7,136,357 B2 | 11/2006 | Soumiya et al. |
| 7,203,176 B2 * | 4/2007 | Golikeri et al. ............... 370/254 |
| 7,242,678 B2 * | 7/2007 | O'Neill et al. ................ 370/349 |
| 2001/0005368 A1 * | 6/2001 | Rune ............................ 370/390 |
| 2002/0032761 A1 | 3/2002 | Aoyagi et al. |
| 2002/0165978 A1 | 11/2002 | Chui |
| 2002/0169884 A1 | 11/2002 | Jean et al. |
| 2003/0097438 A1 * | 5/2003 | Bearden et al. ............... 709/224 |
| 2003/0154271 A1 | 8/2003 | Baldwin et al. |

FOREIGN PATENT DOCUMENTS

| | | |
|---|---|---|
| EP | 0 772 318 A2 | 7/1997 |
| EP | 0 809 383 A2 | 11/1997 |
| EP | 0 996 253 A2 | 4/2000 |
| EP | 0 996 253 A3 | 4/2000 |
| WO | WO 92/05485 | 4/1992 |
| WO | WO 95/06989 | 3/1995 |

* cited by examiner

METHOD AND APPARATUS FOR AUTOMATIC DISCOVERY OF LOGICAL LINKS BETWEEN NETWORK DEVICES

FIELD OF THE INVENTION

The present invention relates to the field of data communications networks, and more particularly to a method and apparatus for automatically discovering logical connections between network devices.

BACKGROUND OF THE INVENTION

A data communications network transmits data among and between network devices (sometimes also referred to as "nodes") physically and logically connected to the network. The physical configuration of a network changes as network devices are added or removed from the network and as physical connections between devices are made or changed. The logical configuration of a network changes as logical connections are established between communicating network devices utilizing the physical structure of the network. Network devices include devices that can send and/or receive data, as well as devices that can forward data. Network devices that can forward data are important in all but the very simplest networks. In most networks direct connections do not exist between most network devices. Instead, each network device is connected to a limited number of adjacent network devices. For network devices to be able to communicate when they are not physically connected, the two communicating network devices rely on intermediate network devices to forward communications between them.

Data is commonly transmitted over a data communications network in the form of discrete chunks of data referred to as "packets". A string of data is broken up into packets at the sending network device and sent separately over the network to the receiving network device. The network device receives the individual packets and assembles them in the correct order to reconstruct the original data string. The particular manner in which packets are broken up and transmitted from one network device to another is defined as a "network protocol". One prominent network protocol is the "Internet Protocol", usually referred to by its acronym, "IP", or as the "IP protocol." Another protocol is called "Multi-Protocol Label Switching", or "MPLS".

Data communications networks are often conceptualized as comprising a hierarchy of communications "layers" that establish different types of connections between network devices. The more basic functions are provided at the lower layers, while successively more sophisticated functions are provided at successively higher layers. Different protocols are used to communicate between devices on each layer. Layering allows sophisticated communications functions to be built up using relatively simple protocols at each layer.

Figure 2:
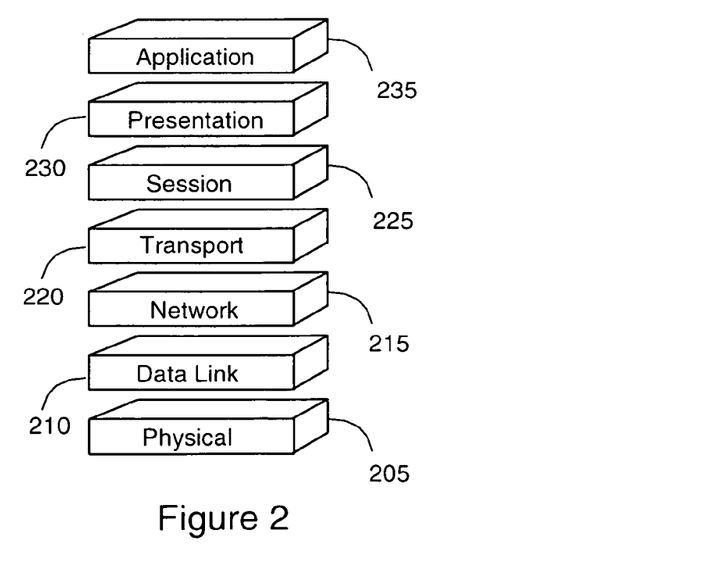
FIG. 2 is a schematic of the OSI seven layer network model.

One common hierarchical network model is the so-called OSI "seven-layer" model. In the OSI model, each lower layer in the model provides communications capabilities or functions that are utilized by the next higher layer. A schematic illustration of the OSI seven-layer model is shown in FIG. 2. As shown in FIG. 2, the seven layers in the OSI model, beginning from the bottom, are physical layer 205, data link layer 210, network layer 215, transport layer 220, session layer 225, presentation layer 230, and application layer 235. In relation to the OSI model, the IP protocol is commonly considered as being associated with the third layer, network layer 215.

In an IP network, each sending and receiving device is assigned a 32-bit address. The address is usually written as a series of four "octets" (e.g., numbers within a range of 0-255) separated by periods. Examples of IP addresses are 127.0.0.1, 205.160.34.112, 23.1.99.244, etc.

Each IP packet sent over an IP network includes the sender's IP address and the recipient's IP address. The recipient's IP address is used to route the packet from the sending network device via intermediate network devices that have IP forwarding capabilities to the recipient network device.

Figure 1:
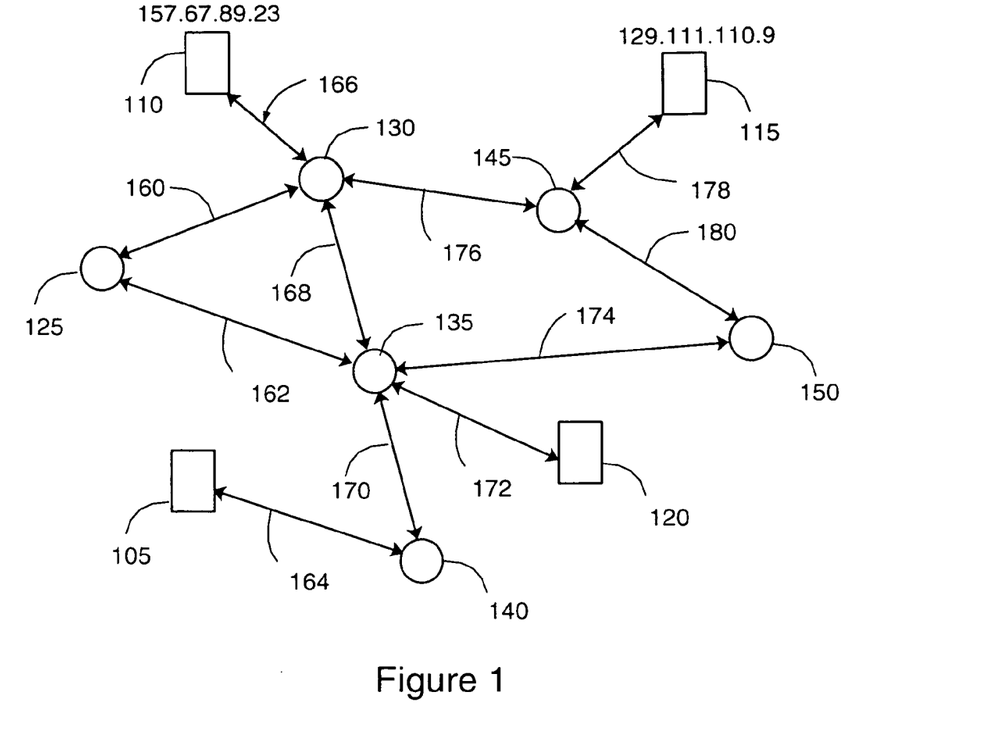
FIG. 1 is a schematic of a data communications network that utilizes data forwarding.

An example of a simple network that illustrates IP forwarding is shown in FIG. 1. The network of FIG. 1 includes two types of network devices: non-IP-forwarding devices 105, 110, 115 and 120 (represented by rectangles in FIG. 1 and which may, for example, comprise personal computers or computer workstations), and IP-forwarding devices 125, 130, 135, 140, 145 and 150 (represented by circles in FIG. 1 and which may, for example, comprise IP routers). The network devices in FIG. 1 are interconnected by a various bidirectional connections or links 160, 162, 164, 166, 168, 170, 172, 174, 176, 178 and 180, represented in FIG. 1 by two-headed arrows. Links 160-180 may comprise direct physical connections between the adjacent network devices, or may comprise logical connections that involve intermediate devices but that are seen by the connected devices as direct connections. For example, network device 110 is connected to network device 130 via link 166. That is, network device 110 knows that if it sends a communication via its interface port that is connected to link 166, the communication will be received by network device 130. It doesn't matter to network device 110 whether link 166 is a single physical connection or a series of physical connections. Logical links such as links 160-180 in FIG. 1 that connect two network devices will be referred to sometimes herein as "IP links". The term "IP links" as used herein includes logical links that use the IP protocol, as well as logical links utilizing other protocols, such as, for example, MPLS.

In the example network of FIG. 1, network device 110 is connected directly (via link 166) only to network device 130. For network device 110 to communicate to any other network device, the IP forwarding capabilities of network device 130 must be used.

In FIG. 1, network device 130 has direct connections to three other network devices in addition to network device 110, to which it is connected via link 166. The other links are links 160, 168 and 176, which connect network device 130 to network devices 125, 135 and 145, respectively. Each of links 160, 166, 168 and 176 are typically connected to separate ports on network device 130. Each port may be a separate physical interface, or two or more ports may share a single physical interface. Each port may have its own IP address assigned to it. In that case, network device 130, as well of each of its ports, may have distinct IP addresses.

Network device 130 of FIG. 1 has been defined to have IP forwarding capabilities. That means it must be able to receive an IP packet (intended for delivery to a network device other than network device 130) from one of the IP links it is connected to and forward it along at least one of the other the IP links it is connected to. In the general case where network device 130 is a typical router, network device 130 will be able to receive and forward IP packets from and to any of the IP links 160, 166, 168 and 176 it is connected to (provided the links are functioning). The other network devices 125, 135, 140, 145 and 150 with IP forwarding capabilities in the example of FIG. 1 are similarly able to receive and forward IP packets from and to any of the IP links they are connected to.

If network device 110 wants to send a communication to, for example, network device 115, there are a number of paths that the communication can take. The most direct path comprises links 166, 176, and 178. However, other paths include the path comprising links 166, 168, 174, 180 and 178, and even the path comprising links 166, 160, 162, 174, 180 and 178.

When network device 110 sends out IP packets to network device 115, it does not know what path each of the packets will take. Network device 110 simply addresses the packet to network device 115 using network device 115's IP number (namely 129.111.110.9 in the example of FIG. 1), and sends it out over link 166 towards network device 130.

What network device 130 does with the packet after it receives it depends on how network device 130 is configured. For example, network device 130 may be configured to forward any packet received from link 166 along link 176. Alternatively, network device 130 may be configured to forward packets along links depending on the destination IP number of the packet. Network device 130 may also be programmed to monitor traffic along each link and to adapt its forwarding scheme to traffic conditions.

How each network device forwards packets depends on the capabilities and configuration of the particular network device. As is evident even from the simple network example of FIG. 1, it is important that network devices that do IP forwarding be properly configured to interoperate with each other to ensure that packets are correctly routed to their destination.

Configuration of network devices within a network comprises an aspect of network management. Network devices may be locally managed or remotely (centrally) managed. Local management of a network device may be accomplished using a workstation or terminal directly connected to the network device. Remote management of a network device may be accomplished from remote terminals or workstations that communicate with the network device via the network, provided the network device is provided with a management protocol that allows remote management. One protocol used for remote management of network devices is the Simple Network Management Protocol (SNMP). SNMP provides a set of commands and parameters that allow communication with and configuration of network devices. A person who is responsible for management of a network is commonly referred to as a "network manager." Network management software systems provide tools to network managers that facilitate central management of often geographically dispersed network devices.

To be able to manage a network device, a network manager must know that the network device exists, how it is connected to the network and to other network devices, and what its capabilities are. In addition, the network device must have the capability of being remotely managed, the network management system used by the network manager must be able to communicate with the network device using the correct protocol, and the network manager must be apply to supply any required logins, passwords, or other security information.

The configuration of large networks often changes through the addition, removal and/or replacement of network devices. To properly manage large networks to ensure that IP packets are routed correctly over the network, the network manager must know when data forwarding network devices are added or removed. One system used to discover network devices with data forwarding capabilities is described in U.S. patent application Ser. No. 10/029,124 for "Method and Apparatus for Automatic Discovery of Network Devices with Data Forwarding Capabilities" assigned to the assignee of the present invention and incorporated by reference herein.

In small local networks, for example those in which the entire network comprises only a handful of network devices, it is relatively easy for a network manager to physically inspect each network device and know from first hand inspection when a network device is added or removed. In large, geographically dispersed networks comprising hundreds of network devices, it would be extremely difficult for the network manager to know from a first hand inspection what the state of the entire network is at any given time.

A network being managed often comprises of a plurality of subnets. A subnet is a group of network devices belonging to a specific block or subset of IP addresses. For example, one type of subnet comprises IP numbers that share the first three octets, as for example 215.223.46.x (where "x" can be any number from 0 to 255). Larger subnets may share only the first two octets (e.g. 215.223.x.y). In addition to subnets, networks may also include individual IP numbers or ranges of IP numbers. A network manager generally will know which subnets are included in the network being managed. However, the network manager will not necessarily know beforehand the IP number of a network device to be added to a network, particularly if the IP number is not within one of the network's known subnets.

In addition to needing to know the identity and physical configuration of the network devices themselves, it is also important for the network manager to be able to monitor logical connections between network devices. A logical connection exists between network devices when at least one port of a first network device is configured so that a message sent out through that port will arrive at a known destination (either a network address or a second network device). The destination may be a particular port or interface on another network device, a particular IP address, or a particular subnetwork.

SUMMARY OF THE INVENTION

The present invention comprises a method and apparatus for automatic discovery of logical links between network devices. In one embodiment, the present invention comprises part of a network management system ("NM") that manages a discrete set of network devices. The NM sends SNMP queries to individual network devices managed by the NM to obtain interface configuration data for each of the network interfaces of the device. The information requested includes destination information ("next hop" or "neighbor" IP address) for data packets sent from the interface.

In addition to receiving interface configuration information from a managed network device in response to a SNMP query, the NM may also receive unsolicited interface configuration information via a SNMP message originating with the network device itself.

The NM checks to see whether a logical link corresponding to the received configuration information already exists in a logical link database maintained by the NM. If such a link exists the NM checks to see if the existing information for the link is valid. If the existing link data is valid, no change is made. If the existing information is not valid, or if no corresponding link is found in the link database, the NM creates a new link corresponding to the new configuration information.

If the destination information for an interface comprises a subnet address, the NM classifies the new link as a "Point-to-Subnet" IP link. If the destination information comprises a normal IP address, the NM checks to see whether the destination IP address corresponds to a network device under management of the NM. If the destination IP address does not correspond to a network device under management of the NM, the NM classifies the link between the network device and the IP address as a "Point-to-IP" link. If the destination IP address corresponds to a network device under management of the NM, the NM classifies the link as a "Point-to-Point" IP link. A "Point-to-Point" IP link may include links between interfaces that do not have individual IP addresses ("unnumbered interfaces").

The NM further classifies IP links into links that utilize the IP protocol ("IP Forwarding"), the MPLS protocol ("MPLS Forwarding"), or both ("IP and MPLS Forwarding").

In one or more embodiments, the NM displays a graphical view of the discovered IP links on a graphical network map.

DESCRIPTION OF THE PREFERRED EMBODIMENT

A method and apparatus for automatically discovering logical links between network devices is presented. In one or more embodiments, the invention comprises part of a network management system ("NM"), such as, for example, the Alcatel 5620 Network Management System. In one or more embodiments, the invention is implemented by means of software programming operating on personal computers, computer workstations and or other computing platforms. In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 3:
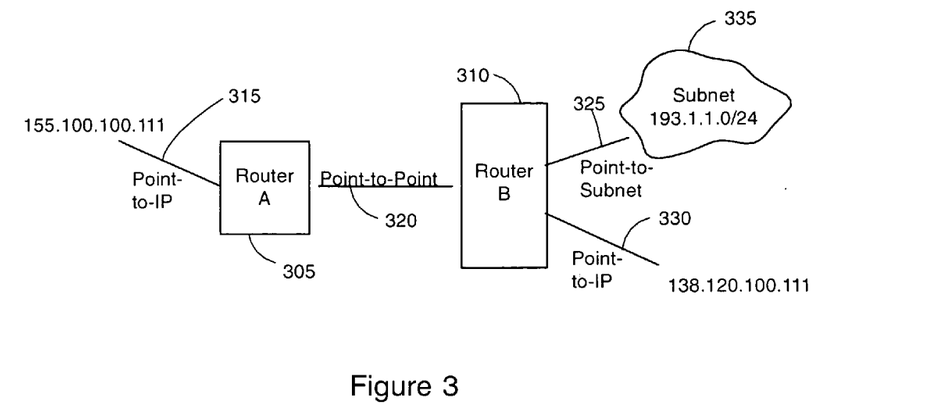
FIG. 3 is a schematic showing examples of types of IP links discovered in an embodiment of the invention.
Figure 4:
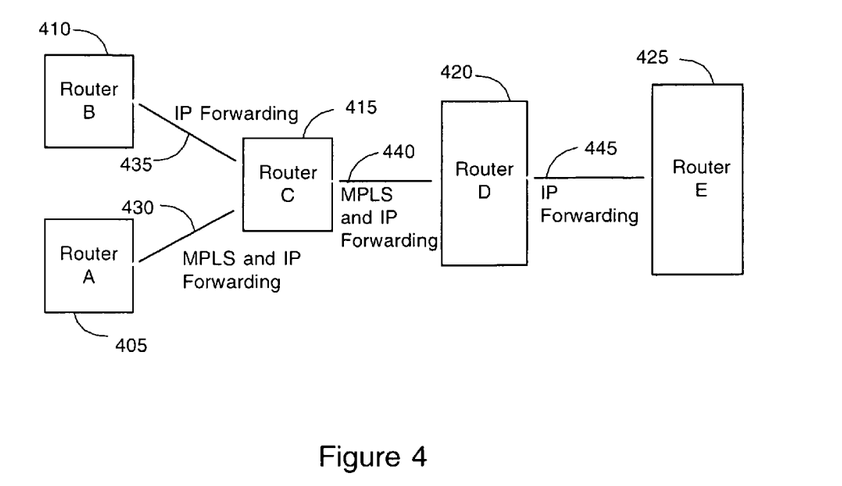
FIG. 4 is a schematic showing examples of types of IP links discovered in an embodiment of the invention.

FIGS. 3 and 4 show examples of types of logical links, referred to herein as "IP links", discovered in one or more embodiments of the invention. IP links are classified according to the characteristics of their endpoints and of the protocols supported.

FIG. 3 shows examples of IP links classified according to their endpoint types. The links are shown with respect to two routing devices, Router A 305 and Router B 310, that are both under management of a network management system ("NM").

Router A 305 has two IP links associated with it. Link 315 connects Router A 305 to a device having the IP address 155.100.100.111. The device associated with the IP address 155.100.100.111 is not being managed by the NM, therefore no information about this device is known to the NM other than its IP number and that it is linked to Router A 305 via link 315. A link from a device being managed by the NM to an IP number for a device that is not being managed by the NM is referred to as a "Point-to-IP" link (an endpoint that terminates at a managed device is referred to as a "Point").

The other link connected to Router A 305 is link 320, which connects Router A 305 to Router B 310. Because each endpoint of link 320 terminates at a device managed by the NM (namely Router A and Router B, respectively), link 320 is referred to as a "Point-to-Point" link.

In addition to link 320, two other links are connected to Router B 310.

Link 330 connects Router B 310 to IP address 138.120.100.111, which is associated with a device that is not managed by the NM. Accordingly link 320, like link 315, is referred to as a "Point-to-IP" link.

Link 325 does not connect Router B 310 to a particular IP address or device, but comprises a broadcast interface connecting Router B 310 to a subnet, designated 193.1.1.0/24. The "0/24" portion of the subnet address indicates that the subnet comprises devices with IP addresses whose first 24 bits comprise the first three specified octets, namely 193.1.1. This type of link, connecting a managed device to a subnet, is referred to as a "Point-to-Subnet" link.

FIG. 4 shows examples of IP links that are classified according to the protocols they support. FIG. 4 shows four IP links 430, 435, 440 and 445 between five routers 405, 410, 415, 420 and 425. All of the routers are managed by a NM. Because the endpoints of each of the IP links in FIG. 4 comprise devices being managed by the NM, links 430, 435, 440 and 445 are all "Point-to-Point" IP links.

Link 430 between Router A 405 and Router C 415 supports both IP and MPLS forwarding. Link 430 is therefore referred to as a "MPLS and IP Forwarding" IP link. Link 435 between Router B 410 and Router C 415 supports only IP forwarding. Link 435 is therefore referred to as an "IP Forwarding" IP link. Link 440 between Router C 415 and Router D 420 is, like link 430, a "MPLS and IP Forwarding" IP link, while link 445 between Router D 420 and Router E 425, like link 435, is an "IP Forwarding" IP link. An additional type of link not shown in FIG. 4 is a link that supports only MPLS forwarding. Such a link is referred to as a "MPLS Forwarding" link.

Point-to-Point links can further be characterized as "numbered" and "unnumbered" Point-to-Point links. Numbered and unnumbered Point-to-Point links are illustrated in FIG. 5.

Figure 5:
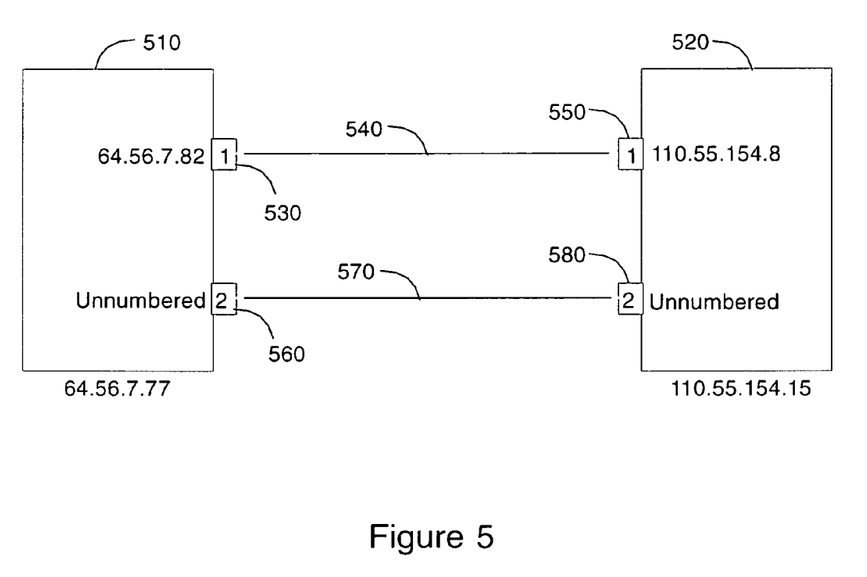
FIG. 5 is a schematic showing examples of numbered and unnumbered interfaces.

FIG. 5 shows two routers 510 and 520, respectively. Router 510 comprises two network interfaces 530 and 560. Interface 530 has been assigned local port number 1 and the IP number 64.56.7.82. It is referred to as a "numbered interface" because it has an IP number assigned to it. Interface 560 has been assigned local port number 2, but has not been assigned an IP number. It is therefore referred to as an "unnumbered interface". Using unnumbered interfaces for IP links conserves IP numbers (important because the number of possible IP numbers is limited).

Router 520 also comprises two network interfaces 550 and 580. Interface 550 is a "numbered interface" that has been assigned local the IP number 110.55.154.8. Interface 580 is an unnumbered interface that has been assigned local port number 2.

Numbered interface 550 is connected to numbered interface 530 via Point-to-Point IP link 540. The configuration data for router 520 in this case identifies the next neighbor for interface 550 as "64.56.7.82" (the IP address for numbered interface 530). Similarly, the configuration data for router 510 identifies the next neighbor for interface 530 as "110.55.154.8" (the IP address for numbered interface 550).

Unnumbered interface 580 of router 520 is connected to unnumbered interface 560 of router 510 via Point-to-Point IP link 570. Although neither interface 560 nor interface 580 have IP numbers assigned to them, they both comprise interfaces of network devices (i.e. router 510 and 520, respectively) that do have IP addresses. Accordingly, the configuration data for router 520 identifies the next neighbor for unnumbered interface 580 as "64.56.7.77" (the IP address of router 510), and the configuration data for router 510 identifies the next neighbor for unnumbered interface 560 as "110.55.154.15" (the IP address of router 520).

Figure 6:
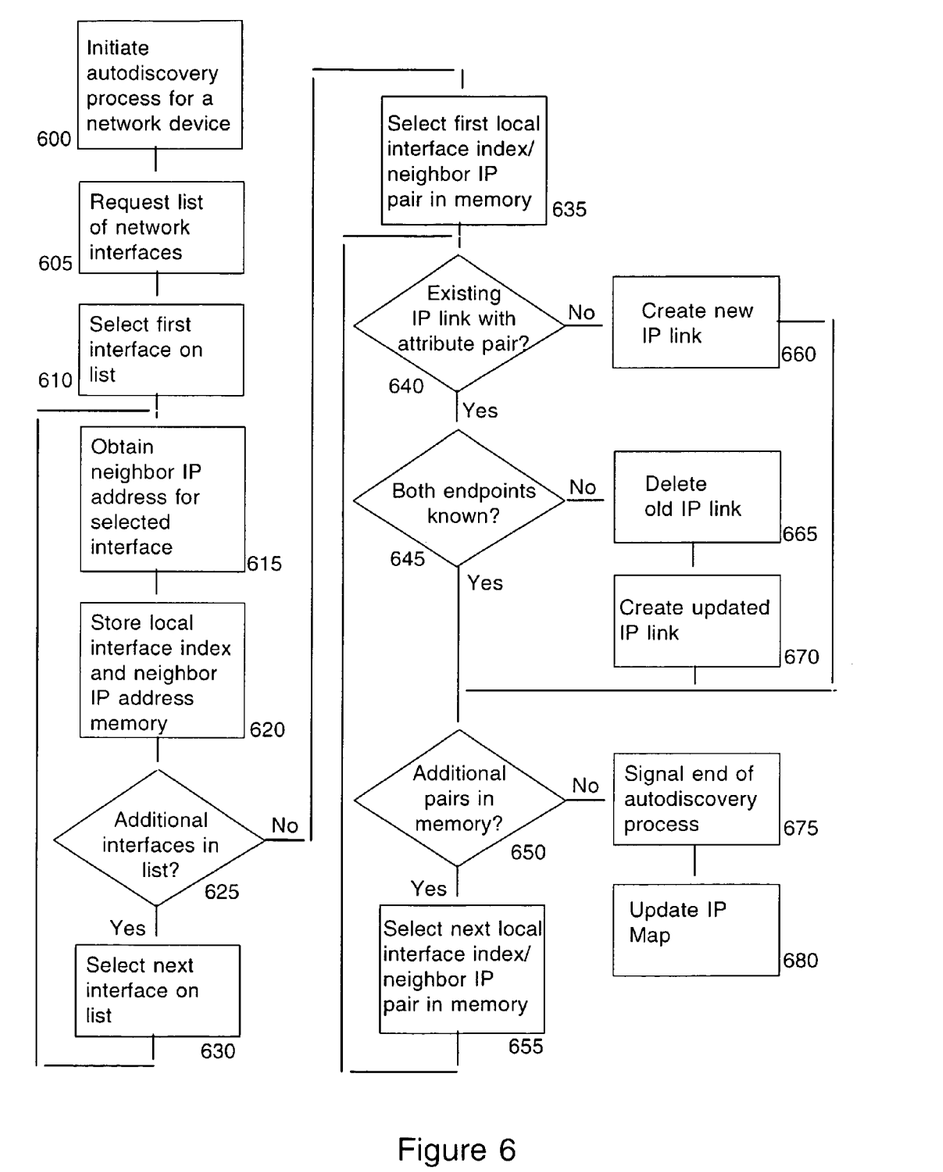
FIG. 6 is a flow chart showing a process used in an embodiment of the invention.

FIG. 6 is a flow chart showing an auto discovery process used in an embodiment of the invention. This embodiment forms part of a network management system (NM) that comprises a number of tools to allow a network manager (user) to manage routing devices in a network environment. The NM provides a graphical user interface (GUI) that displays various views of the network and devices being managed, and that provides menus from which the network manager can select various network management operations. In one or more embodiments, the views that a user may select include a "physical map" that shows a graphical representation of the physical devices and connections in the network being managed (e.g., OSI layers 1 and 2) and an "IP map" that shows a graphical representation of network devices and connections at a higher layer (e.g., OSI layer 3). One of the operations that may be selected is the auto discovery process of FIG. 6, which discovers layer 3 IP links that may be displayed on the layer 3 IP map.

The auto discovery process of FIG. 6 is initiated at block 600. The process may be manually initiated by a user or may be automatically initiated by an initiating event. A user may initiate the auto discovery process, for example, by selected a network device shown on the IP map and selecting a "Discover Links" command from a pull down menu. An example of an initiating event that may activate the process of FIG. 6 is a SNMP message sent to the NM from a network device indicating that a new neighbor has been added to the configuration data for the network device (if the network device has been appropriately configured to send such a SNMP message or "trap" to the NM).

After the auto discovery process of FIG. 6 has been initiated at step 600, the process sends a request to the network device whose IP links are being discovered to obtain a list of local network interfaces (numbered and unnumbered) that have been configured for the network device. The request may be sent, for example, as a SNMP "get-Next" or "get-Bulk" request. The list may identify a local network interface by an index that comprises the IP address (in the case of a numbered interface) and/or the local port number (in the case of an unnumbered interface).

At step 610 the first interface in the list is selected and the neighbor IP address for that interface is obtained at step 615. Depending on the embodiment and the type of requests supported by the NM and the network device, the IP number for the interface may have been included in the information obtained in response the request sent by the NM at step 605, or a separate request to the network device may be necessary to obtain the neighbor IP address. The local interface index for the currently selected interface (for example the IP number of the network device and the port number for the interface in the case of an unnumbered interface or the IP number of the interface in the case of a numbered interface) and its associated next neighbor IP number are stored in memory at step 620. Additional configuration data that may have been obtained from the device, such as the protocol(s) supported by the selected interface, may also be stored.

At step 625 a determination is made as to whether there are any additional interfaces for which the next neighbor IP number has not yet been obtained. If there are such additional interfaces, the next interface is selected at step 630 and the process returns to step 615. If there are no such additional interfaces, the process begins processing the local interface index/next neighbor IP address pairs ("attribute pairs") stored in memory at step 635.

At step 635, the process selects the first local interface index/next neighbor IP address pair from memory. At step 640 a determination is made as to whether an existing link exists (for example in an IP link database maintained by the NM) whose endpoints comprise the currently selected local interface index and the next neighbor IP number. If no such link exists, a new IP link having the local interface index as one endpoint and the next neighbor IP number as the other endpoint is created and added to the IP link database at step 660. The new link may be a Point-to-Point link (numbered or unnumbered) or a Point-to-IP link (depending on whether or not the next neighbor IP number belongs to a device under management of the NM), or a Point-to-Subnet link, as appropriate. The process then proceeds to step 650, where a determination is made as to whether there are any additional local interface index/next neighbor IP address pairs in memory that need to be processed. If no further pairs need to be processed, the end of the auto discovery process is signalled at step 675 (for example by displaying a message to the user on the GUI of the NM), and the IP Map is updated with any discovered new and/or updated links at step 680.

If it is determined at step 640 that an existing link has the currently selected local interface index and next neighbor IP address as its endpoints, the process proceeds to step 645. At step 645, a determination is made as to whether both endpoints are known for the existing link. In this case, an endpoint is "known" if the identity of the network device at that endpoint is under management of the NM, or if the endpoint comprises a broadcast interface to a subnet. For example, for Point-to-Point and Point-to-Subnet links, both endpoints are considered to be "known", while for a Point-to-IP link, the "IP" endpoint is considered to be "unknown."

If it is determined at step 645 that both endpoints of the existing link are "known", no change is made and the process continues to step 650. If it is determined at step 645 that both endpoints are not known, the existing link is deleted at step 665 and an updated link having the local interface index as one endpoint and the next neighbor IP address as the other endpoint is created and added to the IP link database at step 670. The updated link may be a Point-to-Point link (numbered or unnumbered) or a Point-to-IP link (depending on whether or not the next neighbor IP number belongs to a device under management of the NM), or a Point-to-Subnet link, as appropriate. The process then proceeds on to step 650.

An example of a circumstance under which an existing link is deleted and an updated link is created using the procedure of steps 645, 665 and 670 is when there is an existing Point-to-IP link whose "IP" endpoint corresponds to the local interface index of the currently selected local interface index/next neighbor IP address pair. Because the previously "unknown" endpoint is now "known" (i.e. it belongs to a network device that is now being managed by the NM), the existing "Point-to-IP" link is replaced with a new "Point-to-Point" link.

Figure 7A:
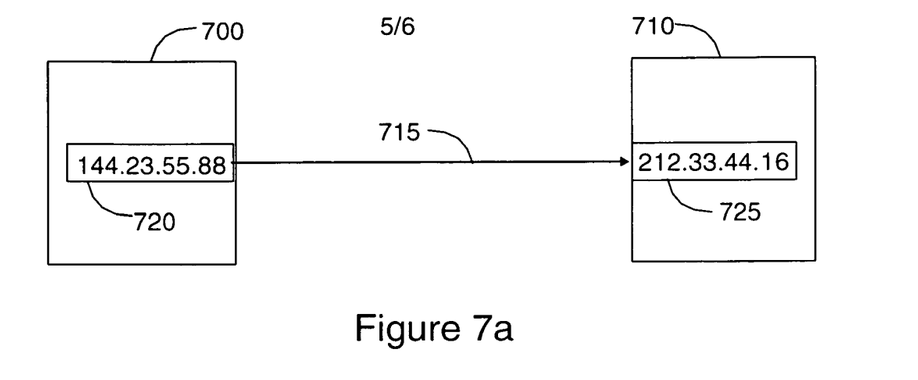
FIGS. 7a, 7b and 7c show examples of graphical depictions of IP links in an embodiment of the invention.
Figure 7B:
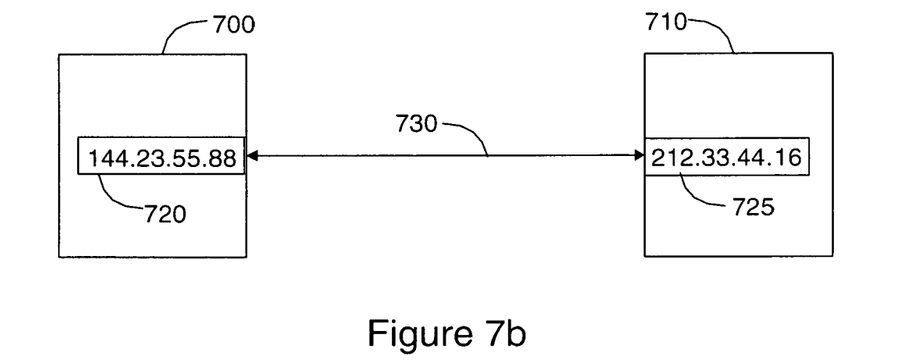
Figure 7C:
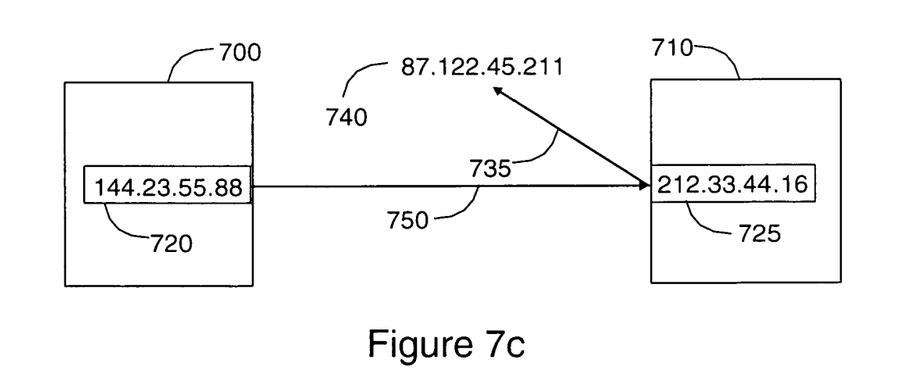

FIGS. 7a, 7b and 7c show examples of how IP links between known (managed) network devices 700 and 710 may be depicted on a graphical IP map in one or more embodiments of the invention.

In FIG. 7a, IP link 715 is shown as a uni-directional arrow from interface 720 (having the IP address 144.23.55.88) on network device 700 to interface 725 (having the IP address 212.33.44.16) on network device 710. The arrow is depicted as going in one direction only: from network device 700 to network device 710. In the embodiment of FIG. 7a, such a uni-directional arrow indicates that the interface at the tail of the arrow (i.e. interface 720) is configured to "see" the interface at the head of arrow (i.e. interface 725) but that the interface at the head of the arrow is not configured to "see" the interface at the tail of the arrow (a first interface "sees" a second interface if the first interface is configured to have the second interface as its "next hop" or "neighbor").

A link such as link 715 of FIG. 7a is not a fully functioning IP link because it only functions uni-directionally, from network device 700 to network device 710. Because link 715 is not fully functional, in addition to being shown as a uni-directional arrow, it may also be shown in a color (for example red) that indicates to a user that there is a problem with the link. In one or more embodiments, a fully functioning link is shown in green, a link that is operational but has a problem is shown in yellow, and a not functioning link is shown in red.

In FIG. 7b, both interface 720 of network device 700 and interface 725 of network device 710 are properly configured to "see" each other. Accordingly, IP link 730 is shown as a bi-directional arrow.

In FIG. 7c, interface 720 of network device 700 is configured to see interface 725 of network device 710. Interface 725, however, is not configured to see interface 720. Instead, its "next neighbor" IP address has been mistakenly configured as 87.122.45.211. Link 750 is accordingly shown as a uni-directional arrow from interface 720 to interface 725. In addition, an additional IP link 735 is shown as a unidirectional arrow from interface 725 to IP address 740.

In the embodiments of FIGS. 7a, 7b and 7c, a user may obtain configuration information for a network device or IP link depicted on the IP map by selecting the device or IP link (for example using a pointing device such as a mouse) and, depending on the embodiment, either double-clicking, right-clicking, or selecting an appropriate pull-down menu command.

Figure 8:
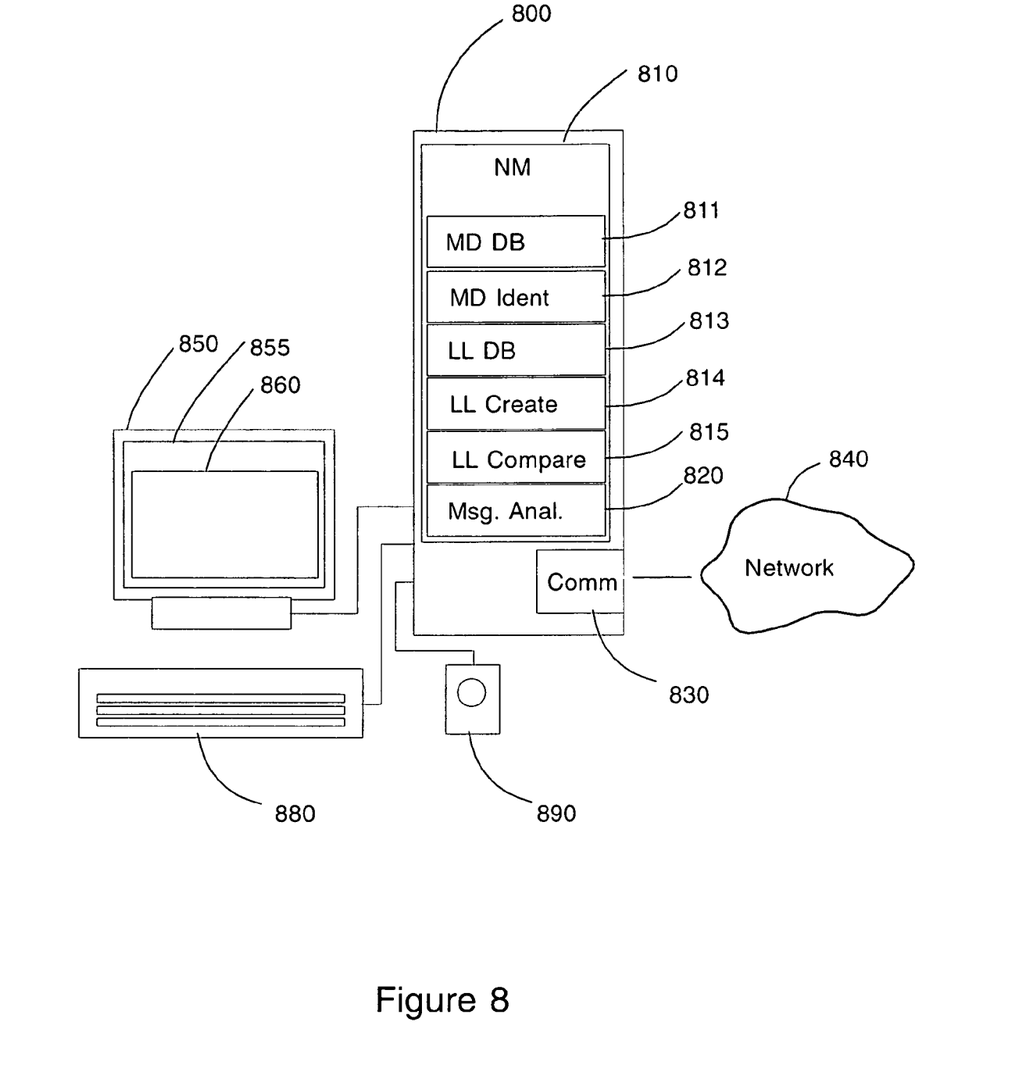
FIG. 8 is a schematic of an apparatus comprising an embodiment of the invention.

FIG. 8 is a schematic of an apparatus comprising an embodiment of the invention. The embodiment of FIG. 8 comprises a central processing unit (CPU) 800, a display device 850, a keyboard 880 and a mouse or trackball 890. CPU 800 may, for example, comprise a personal computer or computer workstation containing one or more processors that execute computer software program instructions. In the embodiment of FIG. 8, CPU 800 comprises computer program instructions for a network management system 810. Network management system 810 comprises a number of software modules, including a managed devices database 811, a managed devices identification system 812, a logical link database 813, a logical link creation system 814, a logical link comparison system 815, and a message analysis system 820 for analyzing messages received by CPU 800 via network communications interface 830, which connects CPU 800 to network 840.

Display device 860, which may, for example, comprise a CRT or LCD computer display device, comprises a display area 855 for displaying graphical and textual information to a user. Display area 855 may also comprise a touch screen or other mechanism for accepting input from a user. In the embodiment of FIG. 8, display area 855 includes a logical link display window 860. In one embodiment, window 860 comprises a discovery range window in which network address ranges for discovering network devices can be specified by a user and are displayed, while window 870 comprises a discovered devices window in which discovered devices are displayed and from which a user can select one or more of the listed devices for management. Display device 860 together with keyboard 880 and mouse or trackball 890 form a user interface that provides information to and accepts information from a user.

Thus, a method and apparatus for automatic discovery of logical links between network devices has been presented. Although the invention has been described using certain specific examples, it will be apparent to those skilled in the art that the invention is not limited to these few examples. For example, although the invention has been described with respect to network devices having IP and MPLS forwarding capabilities, the invention is applicable to network devices having forwarding capabilities using other protocols as well. Other embodiments utilizing the inventive features of the invention will be apparent to those skilled in the art, and are encompassed herein.

The invention claimed is:

1. A method for automatic discovery of logical links associated with network devices comprising the steps of:
   selecting a first managed network device having a first network interface, said first network device being managed by a network management system;
   determining a local interface address and a next neighbor address associated with said first network interface;
   comparing said local interface address and next neighbor address with endpoint address information associated with a plurality of logical links stored in a logical link database associated with said network management system;
   creating a first logical link between said local interface address and said next neighbor address;
   storing said first logical link in said logical link database;
   displaying a graphical representation of said first logical link on a display device.

2. The method of claim 1 further comprising the step of comparing said next neighbor address with a managed devices database associated with said network management system.

3. The method of claim 2 further comprising the steps of:
   determining that said next neighbor address is associated with a second managed network device;
   identifying said first logical link as a logical link between managed network devices.

4. The method of claim 3 wherein said next neighbor address comprises a network address assigned to a port of said second managed network device.

5. The method of claim 3 wherein said next neighbor address comprises a network address assigned to said second managed network device.

6. The method of claim 5 wherein said local interface address comprises a network address assigned to said first managed network device and a port number of said first managed network device.

7. The method of claim 6 wherein said logical link comprises a logical link between unnumbered interfaces.

8. The method of claim 3 wherein said step of displaying said graphical representation of said first logical link comprises displaying a representation of an arrow from said first managed network device to said second managed network device.

9. The method of claim 2 further comprising the steps of:
   determining that said next neighbor address is not associated with a managed network device;
   identifying said first logical link as a logical link between a managed network device and a network address.

10. The method of claim 9 wherein said step of displaying said graphical representation of said first logical link comprises displaying a representation of an arrow from said first managed network device to a representation of said next neighbor address.

11. The method of claim 1 wherein said next neighbor address comprises a subnet address and further comprising the step of identifying said first logical link as a logical link between a managed network device and a subnet.

12. The method of claim 11 wherein said step of displaying said graphical representation of said first logical link comprises displaying a representation of an arrow from said first managed network device to a representation of a subnet.

13. The method of claim 1 wherein said step of creating said first logical link comprises the step of deleting a second logical link in said logical link database.

14. The method of claim 13 wherein said second logical link comprises first and second endpoint address information, said first endpoint address information comprising said next neighbor address and said second endpoint address information comprising said local interface address.

15. The method of claim 14 wherein said logical link database identifies said first endpoint address information as being associated with a network device being managed by a network management system and said second endpoint address information as being associated with a network address.

16. The method of claim 1 further comprising the step of determining that said local interface address is not associated with any logical link in said logical link database prior to creating said first logical link.

17. The method of claim 1 further comprising the step of determining that said next neighbor address is not associated with any logical link in said logical link database prior to creating said first logical link.

18. The method of claim 1 further comprising the step of determining that said next neighbor address and said local interface address are not both associated with any logical link in said logical link database prior to creating said first logical link.

19. The method of claim 1 wherein said local interface address comprises a network address assigned to a port of said first managed network device.

20. The method of claim 1 wherein said local interface address comprises a port number of said first network interface and a first IP address of said first managed network device.

21. The method of claim 20 wherein said next neighbor address comprises a second IP address.

22. The method of claim 21 wherein said second IP address comprises an IP address of a third managed network device.

23. The method of claim 21 wherein said second IP address comprises an IP address assigned to a second network interface of said third managed network device.

24. The method of claim 1 wherein said step of determining said local interface number and said next neighbor address for said first network interface comprises sending a first message from said network management system to said first managed network device and receiving a second message from said first managed network device in response to said first message.

25. The method of claim 24 wherein said first and second messages comprise messages using the SNMP protocol.

26. The method of claim 1 wherein said step of determining said local interface number and said next neighbor address for said first network interface comprises receiving a first message from said first managed network device initiated by said first managed network device upon said first network interface being configured.

27. The method of claim 26 wherein said first message comprises a message using the SNMP protocol.

28. The method of claim 1 further comprising the step of determining a first communications protocol used by said first network interface.

29. The method of claim 28 wherein said first logical link is identified in said logical link database as a logical link utilizing said first communications protocol.

30. The method of claim 28 further comprising the step of determining a second communications protocol used by said first network interface.

31. The method of claim 30 wherein said first logical link is identified in said logical link database as a logical link utilizing said first and second communications protocols.

32. A method for automatic discovery of logical links associated with network devices comprising the steps of:
selecting a first managed network device having a first network interface, said first network device being managed by a network management system;
determining a local interface address and a next neighbor address associated with said first network interface;
comparing said local interface address and next neighbor address with endpoint address information associated with a plurality of logical links stored in a logical link database associated with said network management system;
determining that said local interface address and next neighbor address are both associated with endpoint address information for a first logical link stored in said logical link database.

33. The method of claim 32 further comprising the step of:
verifying that said first logical link comprises a logical link between said first network interface and said next neighbor address.

34. The method of claim 33 wherein said verifying step comprises the steps of:
identifying said next neighbor address as an address associated with a second managed network device;
obtaining a local interface address and a next neighbor address for a second network interface of said second managed network device;
comparing said local interface address and next neighbor address of said second network interface to said local interface address and said next neighbor address of said first network interface.

35. An apparatus for discovering logical links associated with network devices comprising:
a network management system comprising:
a database of managed network devices;
a database of logical links associated with said managed network devices;
a network communications system for sending messages to managed network devices and receiving messages from said managed network devices;
a message analysis system for determining local interface address information and next neighbor address information from messages received from said managed network devices.

36. The apparatus of claim 35 further comprising a logical link display for displaying said logical links.

37. The apparatus of claim 35 further comprising a logical link creation system for creating logical links for storage in said logical links database.

38. The apparatus of claim 37 further comprising a logical link information comparison system for comparing local interface address information and next neighbor address information obtained from messages received by from said managed network devices with endpoint information for said logical links stored in said logical links database.

39. The apparatus of claim 35 wherein said network communications system comprises means for sending and receiving messages utilizing the SNMP protocol.

40. The apparatus of claim 35 further comprising a managed network device identification system for identifying managed network devices associated with said next neighbor address information received from said managed network devices.

41. Apparatus comprising:
- a first managed network device having a first network interface;
- a network management system, said network management system managing said first network device, wherein said network management system selects said first managed network device, determines a local interface address and a next neighbor address associated with said first network interface; compares said local interface address and next neighbor address with endpoint address information associated with a plurality of logical links stored in a logical link database associated with said network management system; creates a first logical link between said local interface address and said next neighbor address; stores said first logical link in said logical link database; and displays a graphical representation of said first logical link on a display device.

\* \* \* \* \*